United States Patent
Kobayashi

(10) Patent No.: US 8,538,092 B2
(45) Date of Patent: Sep. 17, 2013

(54) IMAGE PROCESSING APPARATUS

(75) Inventor: Yukifumi Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1011 days.

(21) Appl. No.: 12/209,552

(22) Filed: Sep. 12, 2008

(65) Prior Publication Data

US 2009/0074260 A1    Mar. 19, 2009

(30) Foreign Application Priority Data

Sep. 14, 2007 (JP) ................................ 2007-238712
Jun. 26, 2008 (JP) ................................ 2008-167678

(51) Int. Cl.
*G06K 9/00* (2006.01)
*G06K 9/46* (2006.01)
*G06K 9/20* (2006.01)
*G06K 9/36* (2006.01)

(52) U.S. Cl.
USPC ........... 382/118; 382/117; 382/165; 382/239; 382/251; 382/282

(58) Field of Classification Search
None
See application file for complete search history.

(56) References Cited

U.S. PATENT DOCUMENTS 5,644,406 A * 7/1997 Harrington et al. ........... 382/239
5,748,776 A * 5/1998 Yoshida ........................ 382/195
7,127,108 B2 * 10/2006 Kinjo et al. ................... 382/203

FOREIGN PATENT DOCUMENTS

JP    07-087510       3/1995
JP    2002-519914 A   7/2002

* cited by examiner

*Primary Examiner* — Matthew Bella
*Assistant Examiner* — Thomas Conway
(74) *Attorney, Agent, or Firm* — Canon USA Inc IP Division

(57) ABSTRACT

An image processing apparatus determines a specific color region that includes a specific color, and a non-specific color region around which the specific color regions are present in three directions, i.e., an upper, left, and right directions, in a picture in the non-specific color regions that are not determined as including the specific color as specific regions to be subjected to predetermined image processing.

7 Claims, 12 Drawing Sheets

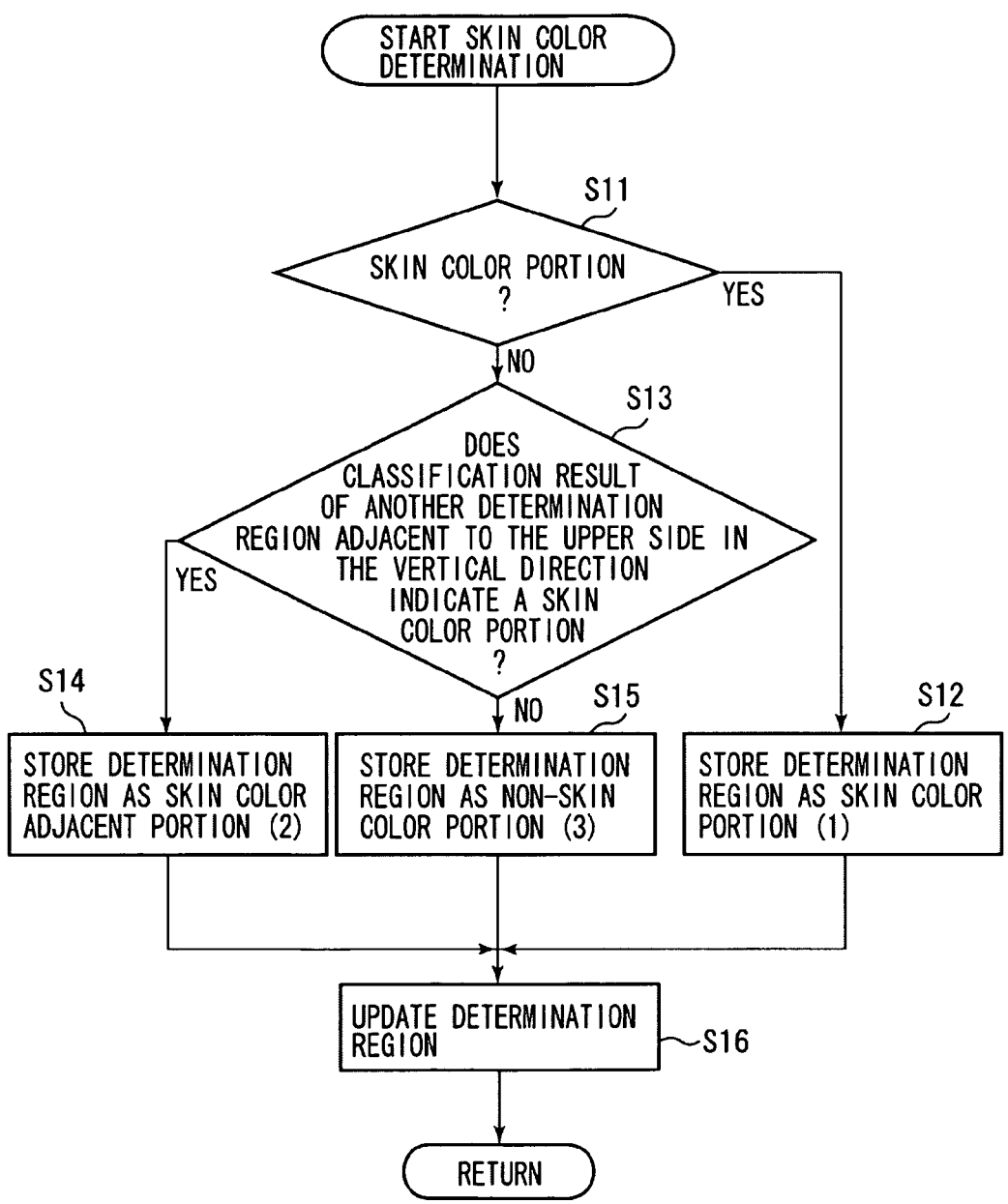

FIG. 7
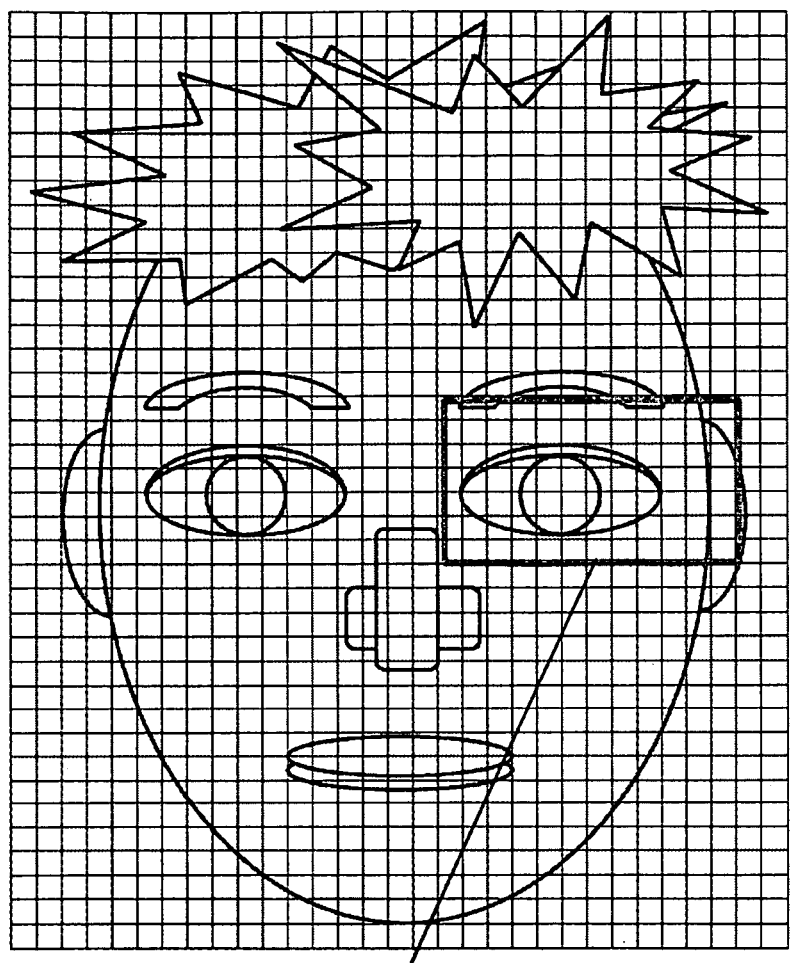
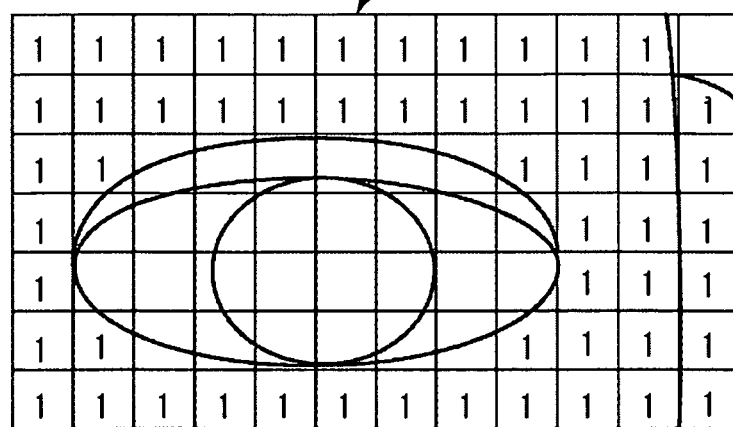

FIG. 9
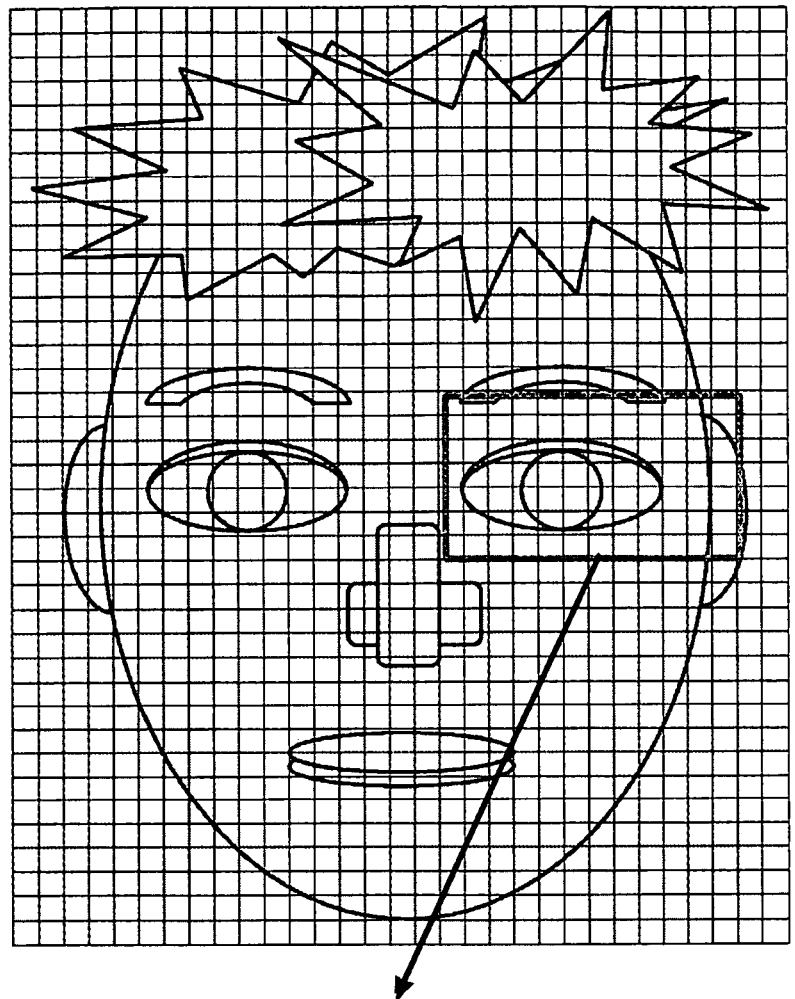
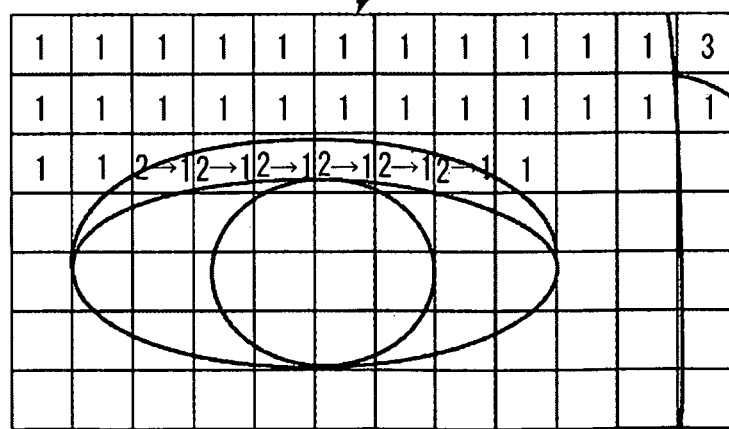

IMAGE PROCESSING APPARATUS

CROSS REFERENCE TO RELATED APPLICATION

This application claims priority from Japanese Patent Applications No. 2007-238712 filed Sep. 14, 2007 and No. 2008-167678 filed Jun. 26, 2008, which are hereby incorporated by reference herein in their entirety.

BACKGROUND OF THE INVENTION

1. Field of the Invention

The present invention relates to a technology for detecting a specific region such as a human face, and performing different image processing to the detected specific region and other regions.

2. Description of the Related Art

In recent years, realization of high-resolution moving image data has fostered the development of products handling a high-definition (HD) image of, for example, 1920×1080 pixels. Such a trend to realize a larger number of pixels is expected to proceed further, and there is prospect of pixels of 4000×2000 or more in the future.

As a device processing high definition moving image data, a digital video camera supporting an HD image is known. A household digital video camera performs compressing and coding of the moving image data in order to effectively record the HD image with a large amount of information in a recording medium.

As a method for compressing a moving image, the moving picture expert group (MPEG) system (MPEG2 and MPEG4) and H.264 are well known. Some of these compression methods for the moving image reduce code amounts by reducing the image quality in a visually inconspicuous image region, thereby providing high coding efficiency.

However, it is difficult for an apparatus itself to distinguish between a visually conspicuous image region and the visually inconspicuous image region. In most cases, thus, an image is divided into fine pixel blocks to identify the region per pixel block based on characteristics such as presence of an edge and color information.

In a case where a pixel block to be processed has the characteristics of human skin color, the apparatus may deem that there is a high possibility that the pixel block represents a "face", and accordingly perform control either not to reduce or to increase the code amount generated for the block. In other words, it is a technique to improve an image quality by allocating more code amount to a face region than other regions because deterioration of the image quality is pronounced when noises are generated in a conspicuous region, such as a human face in the image, by compressing and coding the image. Therefore, a technique that can accurately detect whether the pixel block to be processed represents the face region is required.

A method for detecting the face region is discussed in Japanese Patent Application Laid-Open No. 07-087510. Japanese Patent Application Laid-Open No. 07-087510 describes a method for precisely detecting a region along a contour of a characteristics region (face).

However, the method described in the Japanese Patent Application Laid-Open No. 07-087510 separately searches skin color portions and portions adjacent to the skin color, and it must be determined in advance whether pixels around a determination target pixel are skin colored. In other words, determination of the face region has to be performed by two pass procedures which places a heavy processing load on the apparatus. Therefore, a problem that it takes long time to obtain a determination result arises.

SUMMARY OF THE INVENTION

The present invention is directed to an image processing apparatus which detects a specific region, such as a face in a short period of time, and performs different image processing to the detected specific region and another region. The present invention is also directed to a method for detecting a specific region to detect a portion surrounded by a specific color, such as the skin color, as the specific region.

According to an aspect of the present invention, an image processing apparatus includes a specific color determination unit configured to divide a picture contained in an input image into a plurality of regions and determine whether each of the regions includes a specific color, a storage unit configured to store a determination result of each region determined by the specific color determination unit, and a specific region determination unit configured to determine, according to the determination result of each region stored in the storage unit, a specific region to be subjected to predetermined image processing comprising a specific color region which includes the specific color and a non-specific color region in which the specific color regions are present in upper side, left side and right side in the picture, wherein the non-specific color region does not include the specific color.

According to another aspect of the present invention, an image processing apparatus includes a specific color determination unit configured to divide a picture contained in an input image into a plurality of regions and determine whether each of the regions includes a specific color, a storage unit configured to classify each of the regions into a specific color region, a specific color adjacent region, or a non-specific color region based on a determination result of each region determined by the specific color determination unit and store at least one line of a classification result, a determination result change unit configured to change a classification of the specific color adjacent region sandwiched between the specific color regions into the specific color region in the classification result of each region stored in the storage unit, and a specific region determination unit configured to determine a specific region to be subjected to predetermined image processing according to the classification result stored in the storage unit and a classification change result changed by the determination result change unit.

According to yet another aspect of the present invention, a method for detecting a specific region includes dividing a picture contained in an input image into a plurality of regions to determine whether each of the regions includes a specific color, storing a determination result of each region, and determining, according to the determination result of each region stored at the storing step, a specific region to be subjected to predetermined image processing comprising a specific color region which includes the specific color and a non-specific color region in which the specific color regions are present in upper side, left side and right side in the picture, wherein the non-specific color region does not include the specific color.

According to yet another aspect of the present invention, a method for detecting a specific region includes dividing a picture contained in an input image into a plurality of regions to determine whether each of the regions includes a specific color, classifying each of the regions into a specific color region, a specific color adjacent region, or a non-specific color region based on a determination result of each region and storing at least one line of a classification result, changing a classification of the specific color adjacent region sandwiched between the specific color regions to the specific color region in the classification result of each stored region, and determining a specific region to be subjected to predetermined image processing according to the stored classification result and the classification change result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and together with the description, serve to explain the principles of the invention.

FIG. 3 is a flowchart illustrating skin color determination processing according to an exemplary embodiment of the present invention.

FIG. 7 is a diagram illustrating skin color portions surrounding an eye with respect to the example illustrated in FIG. 6.

FIG. 9 illustrates an example of change made in results of the skin color determination and the face region determination with respect to the example illustrated in FIG. 6.

DETAILED DESCRIPTION OF THE EMBODIMENTS

Various exemplary embodiments, features, and aspects of the invention will be described in detail below with reference to the drawings.

Figure 1:
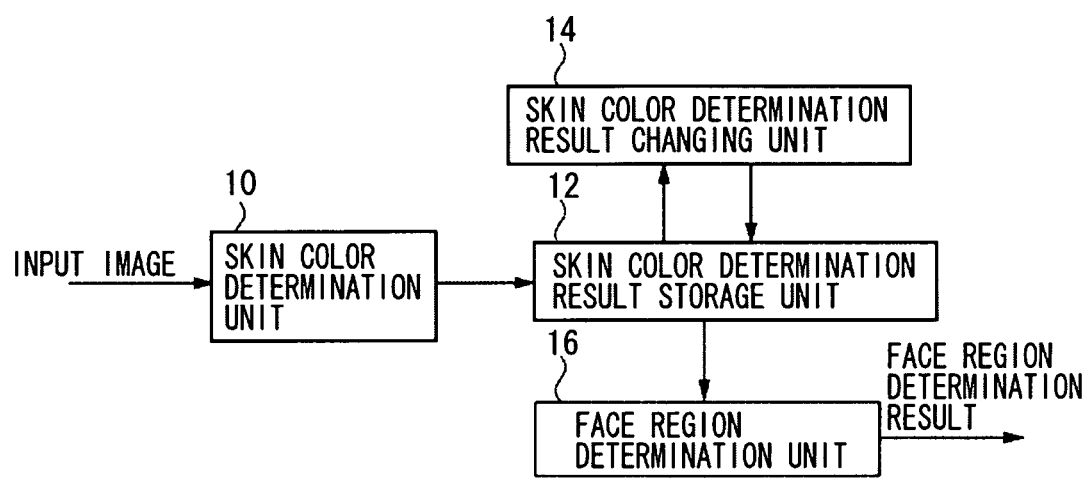
FIG. 1 is a block diagram illustrating an example of a configuration of a specific region detecting apparatus according to an exemplary embodiment of the present invention.

FIG. 1 is a block diagram illustrating an example of a configuration of a specific region detecting apparatus according to an exemplary embodiment of the present invention. The specific region detecting apparatus according to the present exemplary embodiment is applied to an image processing apparatus.

The specific region detecting apparatus according to the present exemplary embodiment includes a skin color determination unit 10, a skin color determination result storage unit 12, a skin color determination result changing unit 14 and a face region determination unit 16. A face region is detected as an example of the present invention, however, the specific region detecting apparatus may be used for detecting a specific region having a specific color other than a face. In consideration of determining the specific color, the skin color determination unit 10 can be referred as a specific color determination unit, the skin color determination result storage unit 12 as a specific color determination result storage unit, the skin color determination result changing unit 14 as a specific color determination result changing unit, and the face region determination unit 16 as a specific region determination unit.

The skin color determination unit 10 determines whether a region in an input image (determination region) is skin colored. A method for determining the skin color according to the present exemplary embodiment defines a range of a reference color phase for the skin color, and determines the skin color by comparing a color phase indicated by a color difference signal in the determination region with the reference color phase. Although the color phase of the skin color is common regardless of race, brightness of the skin color may be defined together with the color phase so that the brightness can be adjusted because the brightness of the skin color may differ among the races and individuals.

The skin color determination result storage unit 12 classifies a skin color determination result determined by the skin color determination unit 10 into any of a skin color portion (specific color portion), a skin color adjacent portion (specific color adjacent portion) and a non-skin color portion (non-specific color portion) and sequentially stores the result. The skin color determination result changing unit 14 re-evaluates the skin color adjacent portion surrounded by the skin color portions in the classification results stored in the skin color determination result storage unit 12, and changes the classification result of the re-evaluated portion into the skin color portion. The skin color determination result storage unit 12 may have a capacity at least for storing the classification results for one horizontal line from the determination region adjacent to the upper vertical direction of the present determination region with respect to an operation of the present exemplary embodiment.

The face region determination unit 16 determines the skin color portion and a closed region that is not skin colored and surrounded by the skin color portions as the face region (specific region) and outputs the face region determination result (specific region determination result).

Figure 2:
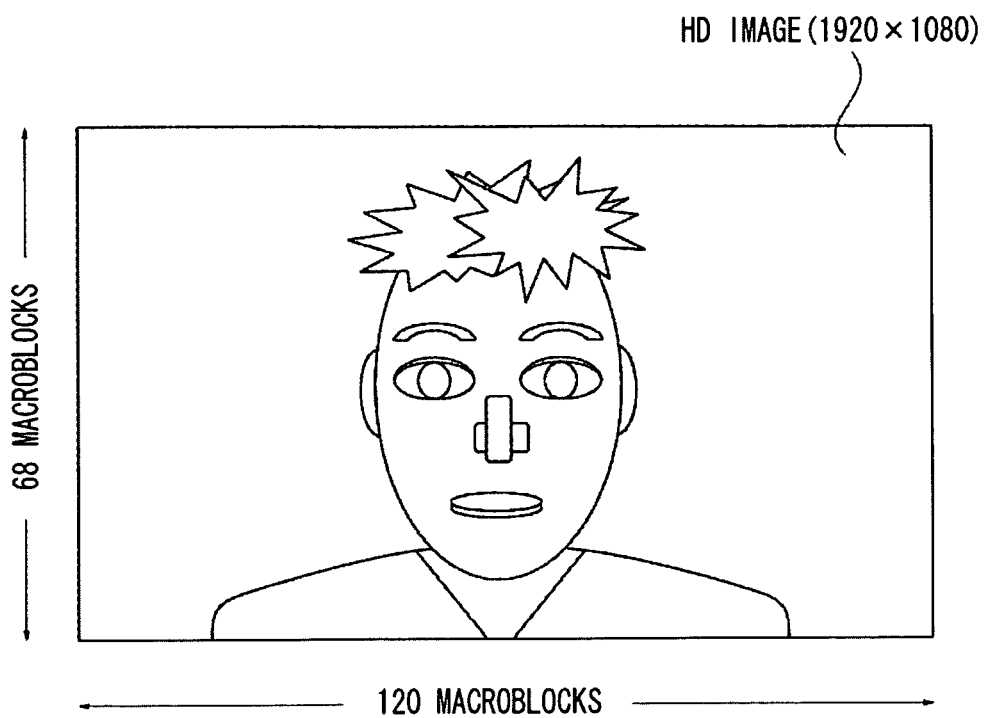
FIG. 2 is an example of a processed input image according to an exemplary embodiment of the present invention.

An operation of the specific region detecting apparatus according to the present exemplary embodiment is described in details as follows. FIG. 2 is an example of an input image to be processed according to the exemplary embodiment of the present invention. An input image is an HD image, for example, containing 1920 pixels×1080 pixels. When the image is divided into pixel blocks of 16 pixels×16 pixels (i.e., a block size as a processing unit for coding, also referred to as a macroblock), macroblocks are formed of 120 pieces in width by 68 pieces in height.

In the present exemplary embodiment, a lump of a rectangular region is regarded as one determination region (skin color determination unit) such as the above described block of 16 pixels×16 pixels (macroblock). Then the determination regions are sequentially scanned in horizontal and vertical directions in a screen and it is determined whether the determination region is skin colored. Scanning is executed in the horizontal direction first, and the horizontal scanning line is sequentially moved in the vertical direction. However, the present exemplary embodiment can be configured to scan in the vertical direction first, and the vertical scanning line is sequentially moved in the horizontal direction. Pixel numbers in each of the determination regions as a unit of the skin color determination may be set to a different size such as 8×8, 4×4, 16×8 pixels in addition to 16×16 pixels, or different size regions may be adaptively-used in a same screen. Each of the determination regions may be partly overlapped.

More specifically, the skin color determination unit 10 clips the determination region of the unit of the skin color determination one by one from the input image to determine whether the determination region is skin colored from components of a color difference signal contained in the determination region. The determination region is scanned in the horizontal and vertical directions. Scanning is generally started from upper left of the screen and moved in the horizontal direction to an end of the screen. Then the scanning is shifted in the vertical direction and continued along another line. A horizontal scanning line (referred to as a horizontal line) in the present exemplary embodiment has a width equivalent to the pixel numbers in the vertical direction of the determination region (for example, 16 pixels). The skin color determination unit 10 supplies the determination result to the skin color determination result storage unit 12.

FIG. 3 is a flowchart illustrating skin color determination processing. According to the information indicating whether the determination region is skin colored that is output from the skin color determination unit 10 for each of the determination regions (determination result), the skin color determination result storage unit 12 classifies the determination results into three types and stores results of the classification as illustrated in the flowchart of FIG. 3. Three classification types include the skin color portion, the skin color adjacent portion and the non-skin color portion. More specifically, in step S11, the skin color determination unit 10 determines whether there is the skin color portion in the determination region. If the determination result of the skin color determination unit 10 indicates that the determination region is skin colored (YES in step S11), the skin color determination result storage unit 12 evaluates the determination region as the skin color portion. Then, the processing proceeds to step S12. In step S12, the skin color determination result storage unit 12 classifies the determination region evaluated as the skin color portion into [1] and stores the determination region.

On the other hand, if the determination result of the skin color determination unit 10 indicates that the determination region is not skin colored (NO in step S11), the processing proceeds to step S13. In step S13, the skin color determination result storage unit 12 determines whether the classification result of another determination region adjacent to the upper side in the vertical direction of the determination region indicates the skin color portion. If the determination region adjacent to the upper side in the vertical direction indicates the skin color portion (YES in step S13), the skin color determination result storage unit 12 evaluates the determination region is the skin color adjacent portion. Then, the processing proceeds to step S14. In step S14, the skin color determination result storage unit 12 classifies the determination region evaluated as the skin color adjacent portion into [2] and stores the determination region.

Figure 4A:
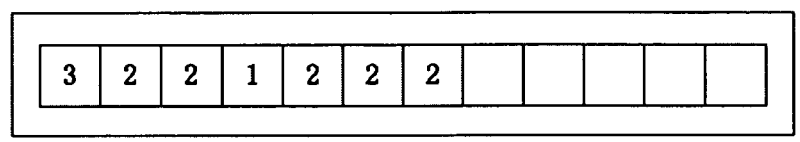
FIGS. 4A to 4C are diagrams to describe an operation performed upon changing a skin color determination result.
Figure 4B:
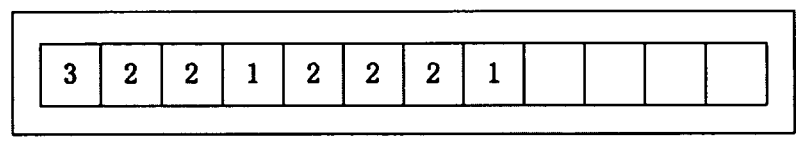
Figure 4C:
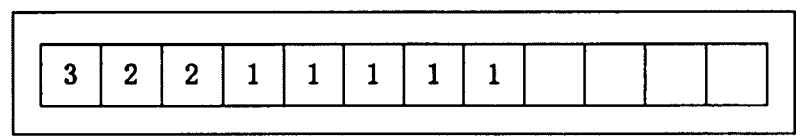

The skin color determination result changing unit 14 changes the classification of the skin color adjacent portion sandwiched between the skin color portions on the horizontal line into the skin color portion according to the classification result of the skin color determination result storage unit 12. FIGS. 4A to 4C are diagrams to describe an operation of the skin color determination result changing unit 14 that changes the skin color determination result. FIG. 4A illustrates storage values (default state) stored in the skin color determination result storage unit 12. In FIGS. 4A to 4C, each block marked with [1], [2], or [3] indicates a determination region. The determination region that is classified as the skin color portion is indicated as [1]. The determination region that is classified as the skin color adjacent portion is indicated as [2]. The determination region that is classified as the non-skin color portion is indicated as [3] as described below. Supposing the skin color determination result storage unit 12 stores the value [1] indicating the skin color portion after the storage value indicated by FIG. 4A, as FIG. 4B indicates. As a result, three determination regions classified as the skin color adjacent portion [2] are sandwiched between the skin color portions [1] from both ends in the storage values (the classification results) of the skin color determination result storage unit 12. When the skin color determination result changing unit 14 detects the skin color adjacent portion [2] is sandwiched by the skin color portions [1] on the horizontal line, the skin color determination result changing unit 14 changes the classification result of the skin color adjacent portion [2] into the value [1] indicating the skin color portion as illustrated in FIG. 4C. Further, on another horizontal line next to the horizontal line, the skin color determination result storage unit 12 determines the skin color adjacent portion based on the classification result after the skin color determination result changing unit 14 changes the value. As described above, a plurality of consecutive skin color adjacent portions [2] can be collectively changed into the skin color portions [1].

Referring back to the flowchart illustrated in FIG. 3, in step S11, if the determination result of the skin color determination unit 10 indicates that the determination region is not skin colored (NO in step S11) and the classification result of the determination region adjacent to the upper side in the vertical direction does not indicate the skin color portion (NO in step S13), the skin color determination result storage unit 12 evaluates the determination region is the non-skin color portion. Then, the processing proceeds to step S15. In step S15, the skin color determination result storage unit 12 classifies the determination region evaluated as the non-skin color adjacent portion into [3] and stores the determination region.

As described above, when the determination region is classified into the skin color portion [1], the skin color adjacent portion [2], or the non-skin color portion [3], the processing proceeds to step S16. In step S16, the skin color determination result storage unit 12 updates the determination region to the next determination region, and the present flow returns to the start of the flowchart. Although the present exemplary embodiment allocates [1] to the skin color portion, [2] to the skin color adjacent portion, and [3] to the non-skin color portion for convenience, this is merely an example.

Figure 5:
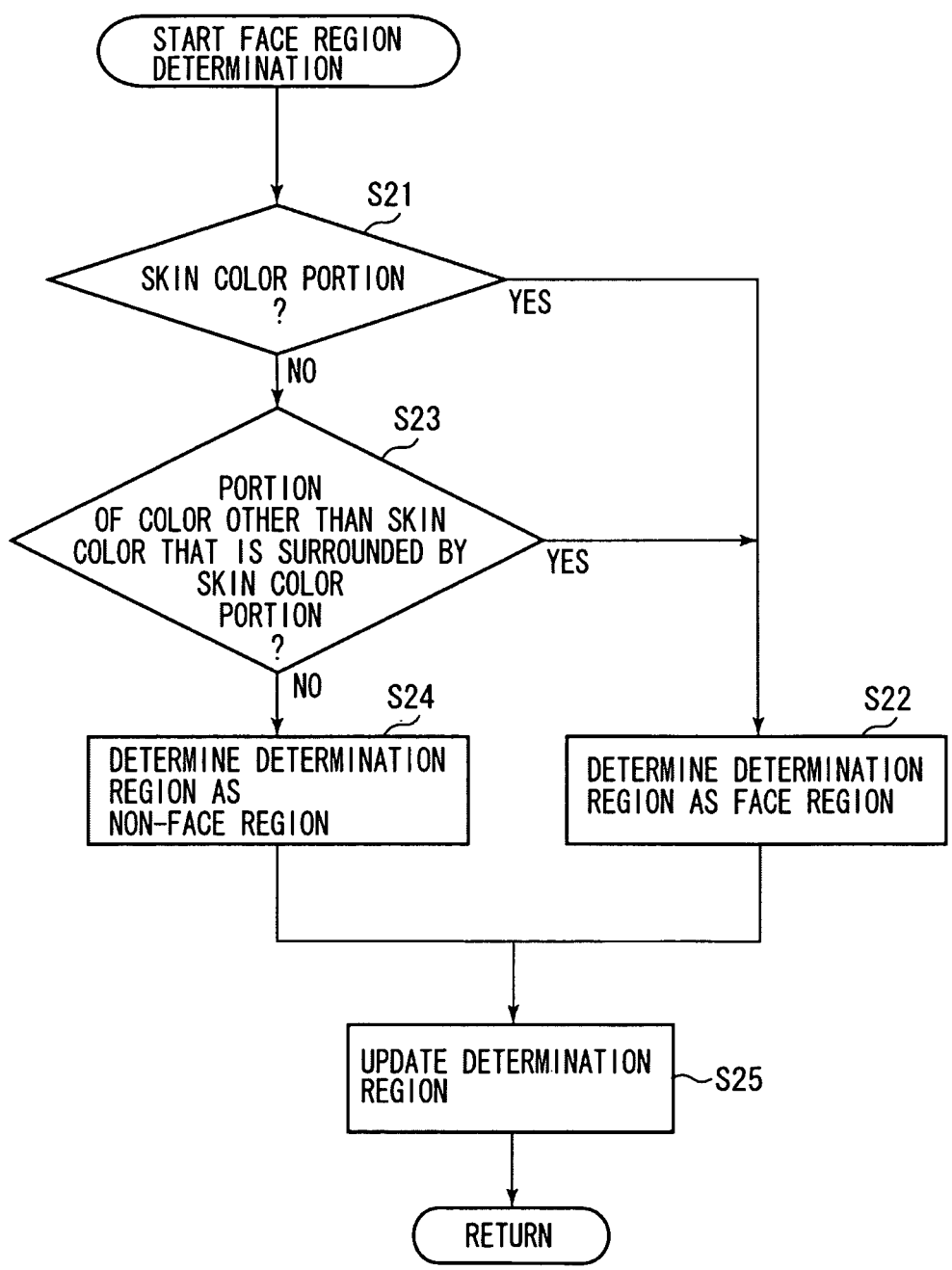
FIG. 5 is a flowchart illustrating face region determination processing according to an exemplary embodiment of the present invention.

FIG. 5 is a flowchart illustrating face region determination processing. The face region determination unit 16 determines the face region (specific region) contained in the input image such as that in FIG. 2 according to the processing flow illustrated in FIG. 5. When face region determination starts, the processing proceeds to step S21. In step S21, the face region determination unit 16 refers to the classification result of each determination region stored in the skin color determination result storage unit 12 to determine whether the determination region is classified into the skin color portion [1]. If the determination region is classified into the skin color portion [1] (YES in step S21), the processing proceeds to step S22. In step S22, the face region determination unit 16 determines the determination region as a part of the face region (specific region).

On the other hand, if the face region determination unit 16 determines that the determination region is not the skin color portion (NO in step S21), the processing proceeds to step S23.

In step S23, the face region determination unit 16 determines whether the region is a portion that has been changed from the skin color adjacent portion [2] to the skin color portion [1] by re-evaluation of the skin color determination result changing unit 14. If the region is the portion that has been changed from the skin color adjacent portion [2] to the skin color portion [1] (YES in step S23), the processing proceeds to step S22. In step S22, the face region determination unit 16 determines the determination region as a part of the face region (specific region). Here, the region changed from the skin color adjacent portion [2] to the skin color portion [1] is a region where the skin color portions are present in at least three directions (i.e., upper side, right side and left side in a picture). In other words, the changed region is a portion of color other than the skin color that is surrounded by the skin color portions. This determination processing is applicable, for example, when extracting eyes and a mouth of a face. Accordingly, the face region determination unit 16 can collectively determine a plurality of consecutive skin color adjacent portions [2] which are sandwiched between the skin color portions [1] as the face region according to a change result sent by the skin color determination result changing unit 14.

If the face region determination unit 16 determines that the determination region is not the skin color portion (NO in step S21), and not the portion of color other than the skin color that is surrounded by the skin color portions (NO in step S23), the processing proceeds to step S24. In step S24, the face region determination unit 16 determines the determination region as a part of the non-face region (non-specific region). The non-face region (non-specific region) includes the non-skin color portion [3] and the determination region remaining as the skin color adjacent portion [2] of the classification result stored in the skin color determination result storage unit 12.

As described above, when the determination is completed on whether the determination region is the face region or the non-face region, the processing proceeds to step S25. In step S25, the face region determination unit updates the determination region to execute the face region determination for the result of the next determination region stored in the skin color determination result storage unit 12. Then the present flow returns to the start of the flowchart.

The face region determination unit 16 accordingly determines the skin color portion and the non-skin color region which is surrounded by the skin color portions in three directions (i.e., upper side, right side and left side in a picture) as the face region (specific region) and outputs the face region determination result (specific region determination result) with respect to the input image.

Figure 6:
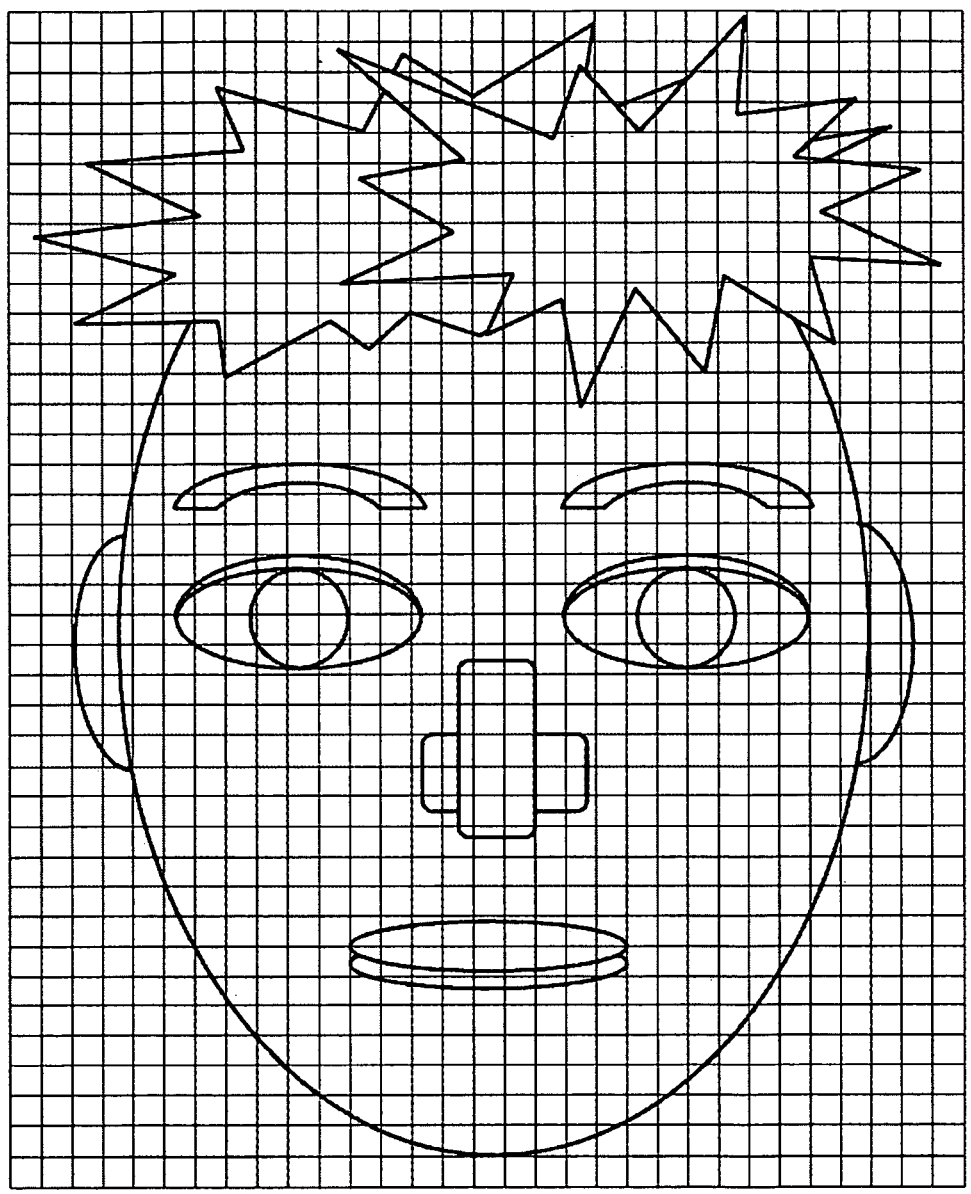
FIG. 6 is an example of an enlarged face portion in an input image.
Figure 11:
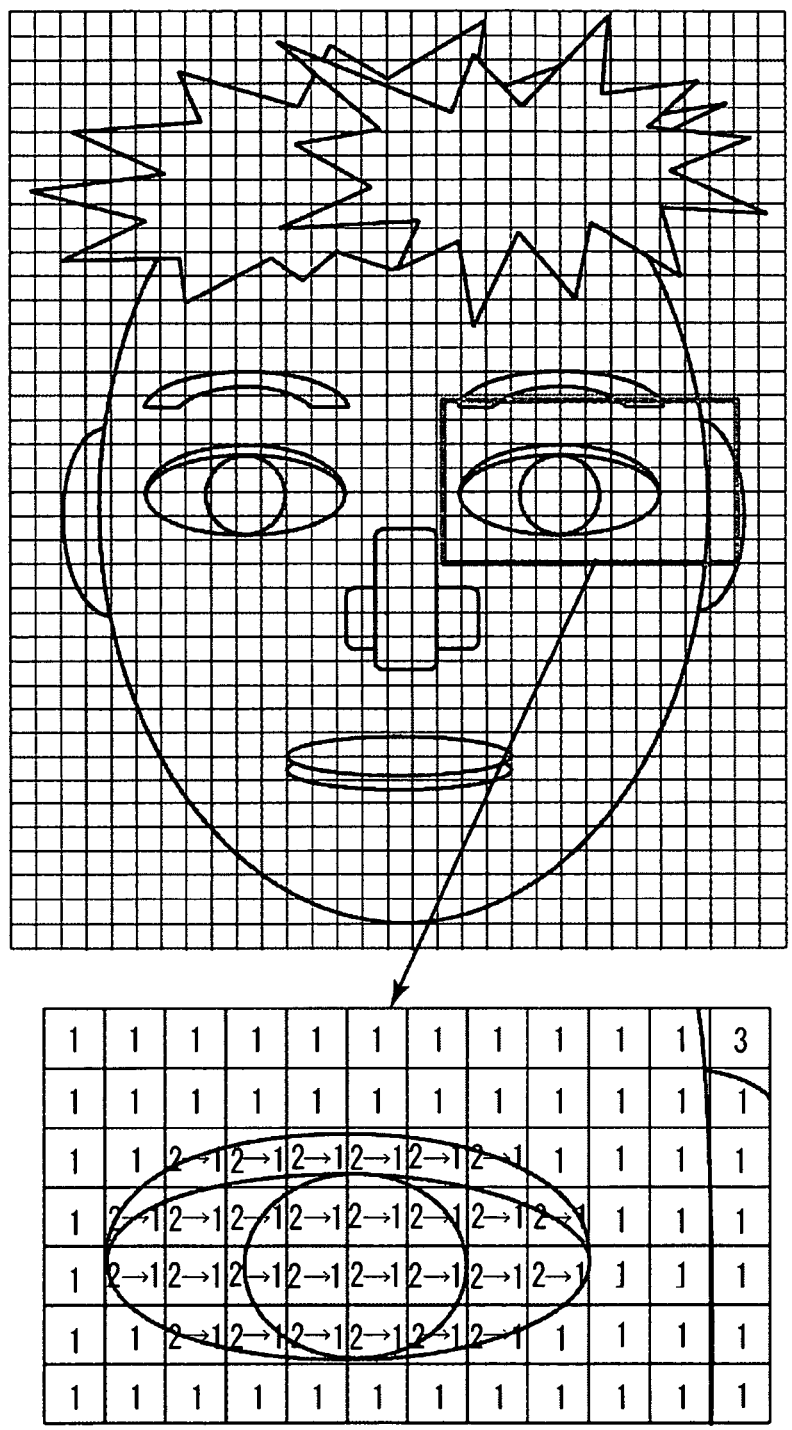
FIG. 11 illustrates an example of change made in results of the skin color determination and the face region determination with respect to the example illustrated in FIG. 6.

The above-described operation according to the face region determination of the present exemplary embodiment is further described by referring to FIGS. 6 and 11.

FIG. 6 is an example of an enlarged face portion in an input image. FIG. 7 is a diagram illustrating skin color portions surrounding an eye with respect to the example illustrated in FIG. 6. As illustrated in FIG. 7, when every determination region of the unit of aforementioned skin color determination is classified whether it is skin color, eyes are not the skin color portions, but the surrounding portions of the eyes are skin color portions. Outside of the face is not the skin color portion. The eyes and the surrounding portions of the eyes are described below as an example.

Figure 8:
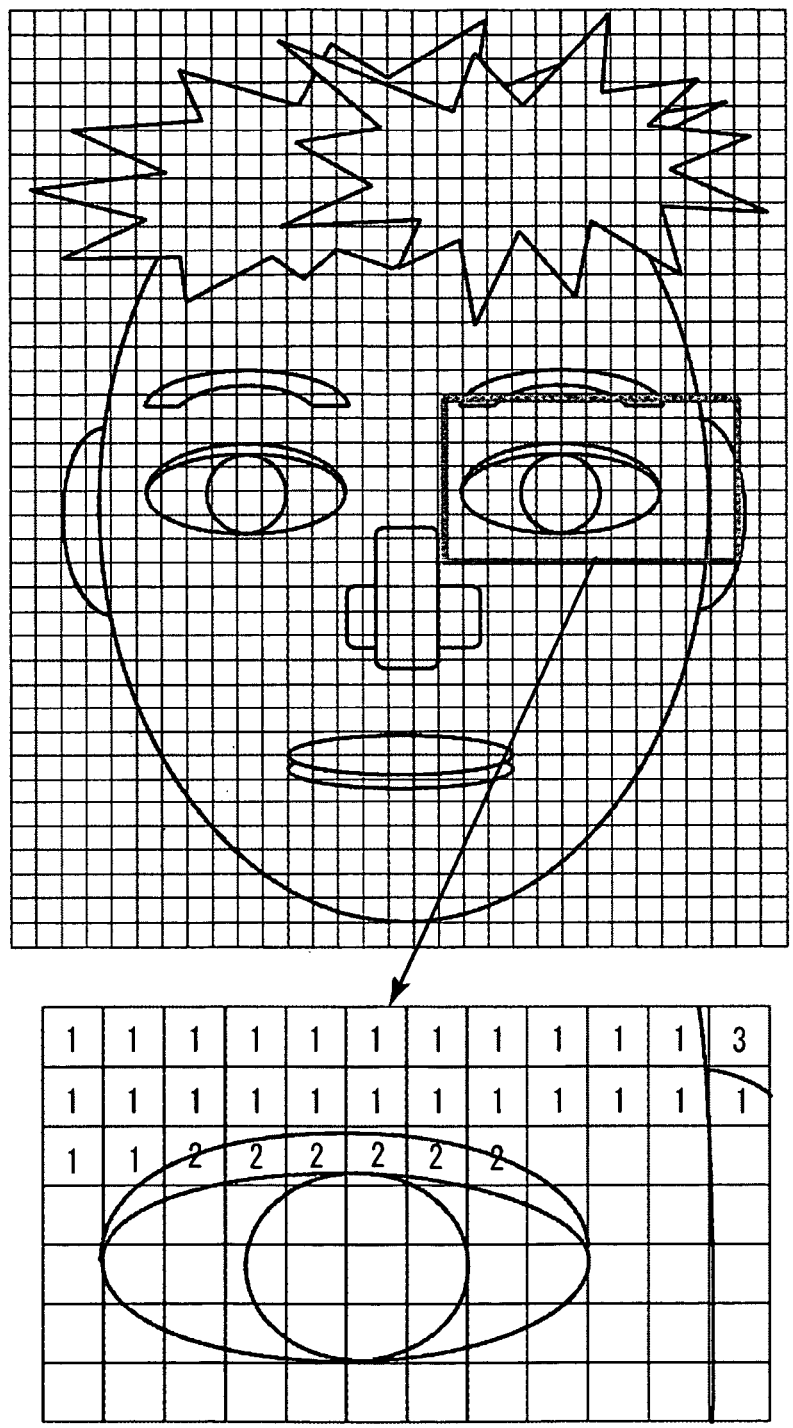
FIG. 8 illustrates an example of change in results of a skin color determination and a face region determination with respect to the example illustrated in FIG. 6.

The skin color determination processing according to the present exemplary embodiment includes scanning of the determination region which is the unit of the skin color determination in the image illustrated in FIG. 6 from upper left to lower right to gradually determine whether the image is skin colored. FIGS. 8 and 11 are examples of change in results of the skin color determination and the face region determination with respect to the example illustrated in FIG. 6. To FIGS. 8, 9, 10 and 11 are appended values indicating the classification results obtained by the skin color determination result storage unit 12 and the skin color determination result changing unit 14. As numeral values appended to each of the determination regions, [1] represents the skin color portion, [2] represents the skin color adjacent portion, and [3] represents the non-skin color portion.

In FIG. 8, the skin color determination unit 10 sequentially clips the determination region from the upper left of the image to determine whether every determination region is skin colored. Since the determination region surrounding the eyes is skin colored, the skin color determination result storage unit 12 classifies the determination region as the skin color portion [1]. The determination region outside the face is classified as the non-skin color portion [3].

Although the determination region in the eye portion is not skin colored, the skin color determination result storage unit 12 classifies the determination region as the skin color adjacent portion [2] because the determination region adjacent to the upper side in the vertical direction is classified as the skin color portion [1].

In FIG. 8, the eye portion is classified as the skin color adjacent portion [2]. Further, the determination region positioned at the right side towards the eyes is classified as the skin color portion [1] as illustrated in FIG. 9. Under this state, the skin color determination result changing unit 14 changes the skin color adjacent portion [2] in the eye portion surrounded by the skin color portions [1] into the skin color portion [1] because both the right and left portions of the eyes are evaluated as the skin color portion [1].

Figure 10:
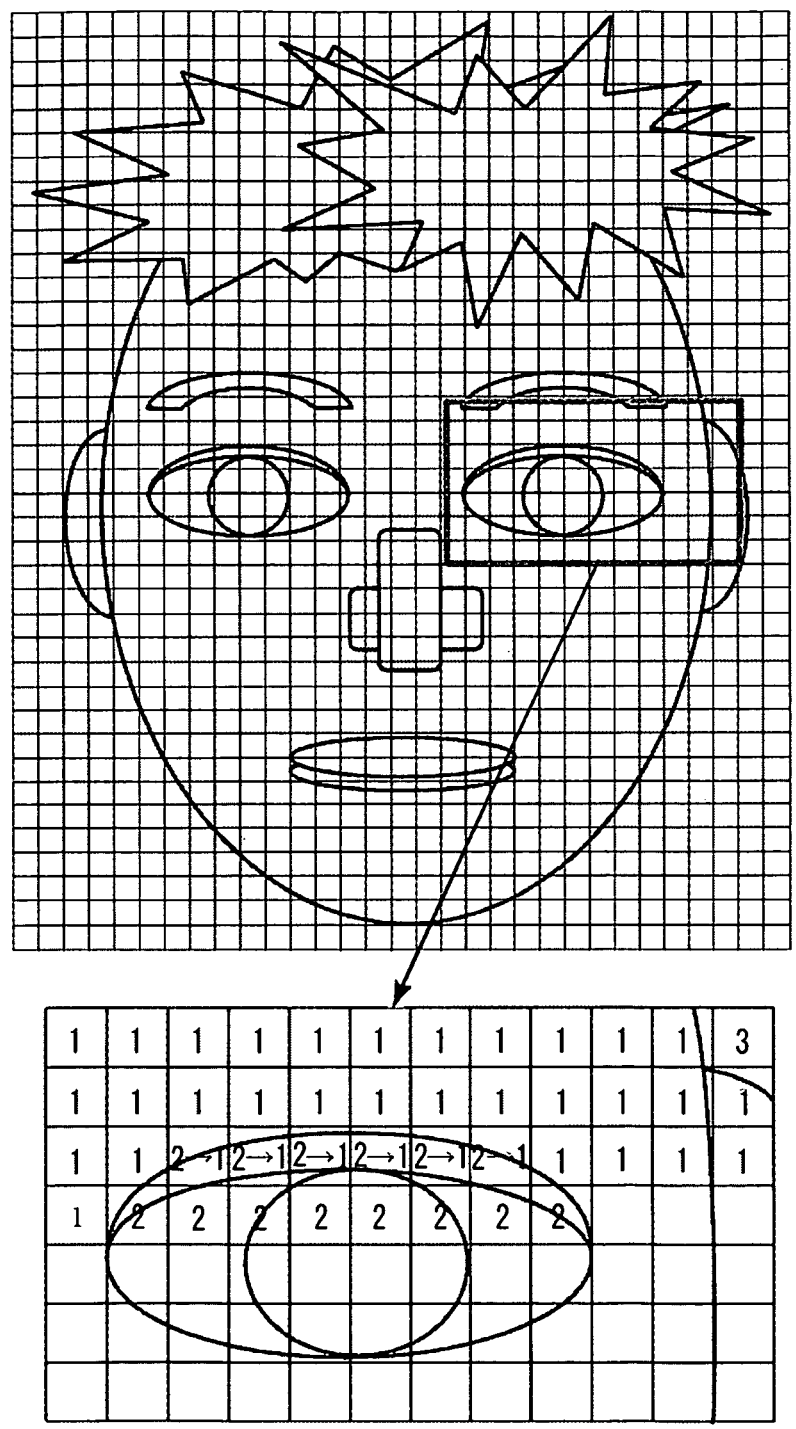
FIG. 10 illustrates an example of change made in results of the skin color determination and the face region determination with respect to the example illustrated in FIG. 6.

In FIG. 9, the skin color determination result changing unit 14 changes the region in the first line of the eyes into the skin color portion [1]. Further, as illustrated in FIG. 10, when the skin color determination result storage unit 12 evaluates the second line of the eye portion, the skin color determination result storage unit 12 first regards that each of the determination regions of the first line of the eye portion adjacent to the upper side is the skin color portion [1], then classifies the determination regions of the second line of the eye portion as the skin color adjacent portion [2]. The skin color determination result changing unit 14 then changes the skin color adjacent portion [2] into the skin color portion [1] similar to the first line of the eyes.

When the above-described operations are repeated for the subsequent lines from the third line of the eye portion, classification of entire determination regions is completed as illustrated in FIG. 11.

According to the present exemplary embodiment, the skin color determination processing and the face region determination processing can be concurrently executed with one pass by simultaneously operating the skin color determination unit 10, the skin color determination result storage unit 12, the skin color determination result changing unit 14 and the face region determination unit 16 included in the specific region detecting apparatus. The face region determination unit 16 sequentially performs the face region determination for every determination region based on the classification result and the change result stored in the skin color determination result storage unit 12 on every one horizontal line basis. Thus, the face region can be determined in a short time.

The present exemplary embodiment can thus determine the skin color portion and the portion of color other than the skin color surrounded by the skin color such as eyes (closed region), as the face region in the short time. Further, when the input image is an HD image such as the example in FIG. 2 or an image with higher definition and focusing a close-up of a face for example, a considerable number of interior regions of the face indicating color other than the skin color such as eyes, a nose, a mouth and eyebrows are present, and a number of macroblocks are allocated therein. Supposed special image processing such as image quality enhancement processing is performed only to the skin color portion at the time of coding, image quality of the other portions such as eyes, a nose, a mouth, or eyebrows would look deteriorated. Thus, the method according to the present exemplary embodiment can process the interior regions of the face, such as eyes, a nose, a mouth or eyebrows as the face regions similar to the skin color potion. For example, a predetermined image processing with different contents can be performed for the face region and another region. As an example of the predetermined image processing, a configuration for coding the face region in high image quality is described below.

Figure 12:
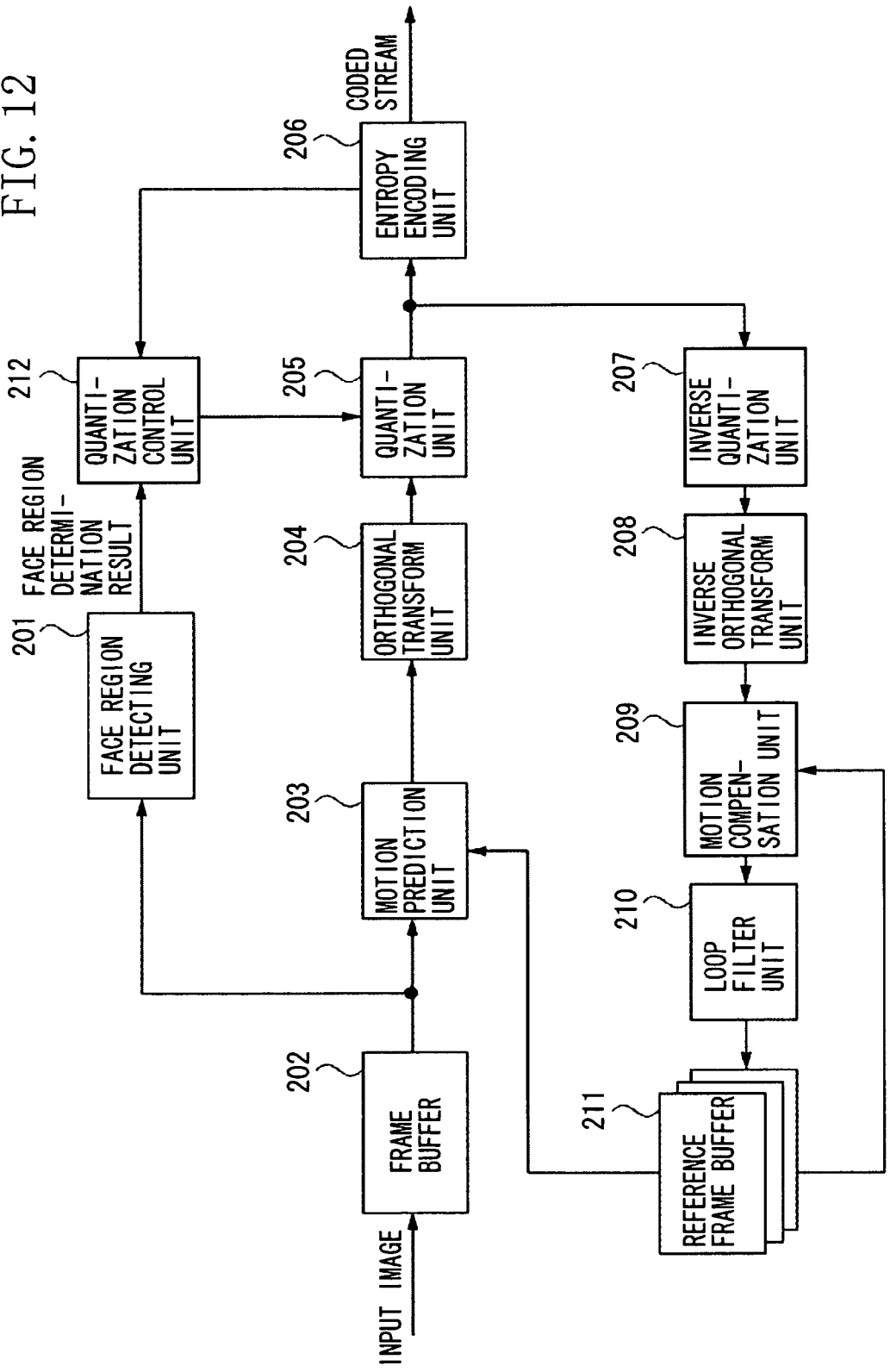
FIG. 12 is a block diagram illustrating an example of a configuration of an image processing apparatus according to an exemplary embodiment of the present invention.

FIG. 12 is a block diagram illustrating an example of a configuration of an image processing apparatus to which the specific region detecting apparatus according to the exemplary embodiment of the present invention is applied. As an example, the exemplary embodiment is applied to an image processing apparatus that performs compressing and coding of data in an H.264 system.

An input image data as a target for coding is stored in a frame buffer 202. The input image data to be coded is read out from the frame buffer 202 from the upper left in an order of the raster per macroblock, and input in parallel to a face region detecting unit 201 and a motion prediction unit 203. The face region detecting unit 201 has a configuration and functions of the aforementioned specific region detecting apparatus.

The face region detecting unit 201 determines the face region contained in the input image by the above-described method in parallel with the coding processing of the input image data in real time, and supplies the face region determination result to a quantization control unit 212.

The quantization control unit 212 receives information about an amount of generated codes for every macroblock from an entropy encoding unit 206 to be described below and decides a quantization step size which serves as a basis to obtain the target amount of generated codes. At this time, if the face region determination result has been input from the face region detecting unit 201, the quantization control unit 212 performs different quantization controls for each of the macroblock corresponding to the region determined as the face region and other macroblock according to the face region determination result. More specifically, the quantization control unit 212 compares the macroblock corresponding to the region determined as the face region with the macroblock corresponding to the region determined as a non-face region, and adjusts the quantization step size as the basis according to the comparison result. Particularly for the macroblock corresponding to the region determined as the face region, the quantization control unit 212 adjusts the quantization step size as the basis to the macroblock with a fine quantization step size and determines a final quantization step size. The determined quantization step size is output to a quantization unit 205.

The motion prediction unit 203 performs prediction in a frame (intra-prediction) or between frames (inter-prediction). A reference frame buffer 211 stores a local decoded image (reference image) referred at the time of the prediction. The motion prediction unit 203 predicts a motion of the macroblock to be coded from the input image received from the frame buffer 202 and the reference image stored in the reference frame buffer 211, and calculates a motion vector. Then, the motion prediction unit 203 calculates a difference between the input image and the reference image to output a difference image to an orthogonal transform unit 204.

The orthogonal transform unit 204 performs discrete cosine transform to the input difference image to output transform coefficient data to the quantization unit 205. The quantization unit 205 quantizes the input transform coefficient data according to the quantization step size received from the quantization control unit 212. The coefficient data after the quantization is transmitted to the entropy encoding unit 206 and an inverse quantization unit 207.

The entropy encoding unit 206 performs zigzag scanning, alternate scanning, and variable length coding to the input coefficient data after the quantization. The entropy encoding unit 206 also performs the variable length coding to information other than the input coefficient data after the quantization, such as the motion vector, the quantization step size, and a macroblock division size, generates and outputs a coding stream. The entropy encoding unit 206 further calculates the amount of generated codes per macroblock at the time of coding and outputs the amount to the quantization control unit 212.

The inverse quantization unit 207 executes inverse-quantization to the input coefficient data after the quantization to generate a transform coefficient for local decoding, and outputs the coefficient to an inverse orthogonal transform unit 208. The inverse orthogonal transform unit 208 performs inverse discrete cosine transform to the input transform coefficient and to generate difference image data. The difference image data is output to a motion compensation unit 209. The motion compensation unit 209 acquires the reference image on the motion vector position from the reference buffer 211 and generates data for the local decoding image by adding the reference image data and the input difference image data.

The image data generated by the motion compensation unit 209 is output to a loop filter unit 210. The loop filer unit 210 executes deblocking filter processing for the input image data. In other words, the loop filer unit 210 executes filtering processing for removing a block noise that often occurs at a macroblock boundary and makes a block boundary unnoticeable. The image after performing deblocking filer processing by the loop filer unit 210 is stored in the reference frame buffer 211 for further coding as a local decoding image.

According to the above described operations, the coded stream and the local decoding image are generated. The above described coding processing provides an image with excellent image quality because more code amount is allocated to the portions determined as the face region than another region in the generated coded stream and the local decoding image.

As described above, the present exemplary embodiment can detect the portions that are not skin colored, but surrounded by the skin color as the face region, such as eyes in a face. Using this detection technique for compressing and coding of an image containing a human face enables to compress and code the face portion that is not skin colored in high image quality as a part of the face region.

Although hardware is described as one exemplary embodiment of the present invention, it is obvious that entire or a part of the processing can be implemented by software.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
a specific color determination unit that determines whether an input image is a specific color region that includes specific color in each predetermined size region, wherein the region of the input image include a plurality of pixels;
a classifying unit that classifies the predetermined size regions of the input image to a first region, a second region or a third region, according to the determination by the specific color determination unit; and
a specific region determination unit that determines a specific region to be subjected to predetermined image processing, according to the classifying by the classifying unit,
wherein the classifying unit classifies, in order of a horizontal direction of the input image, a region which is the specific color region as a first region, a region which is not the specific color region as a third region, and a second region which is not the specific color region but upper region is a first region,
wherein the classifying unit classifies a region which is classified as the second region as a first region, which is wedged by a region classified as a first region in the line which is being classified, before starting classifying processing of a bottom line which is being classified;
wherein the specific region determination unit determines that the region classified as the first region is the specific region.

2. The image processing unit according to claim 1, wherein the specific region is a face region representing a human face.

3. The image processing apparatus according to claim 1, wherein the specific color is skin color.

4. The image processing apparatus according to claim 1, further comprising:
an image processing apparatus that processes the input image,
wherein the image processing unit performs a predetermined image processing to the specific region and performs image processing different from the predetermined image processing to a region that is not the specific region.

5. The image processing apparatus according to claim 4, wherein the image processing unit compresses the input image and sets a predetermined quantization step size to the specific region and sets quantization step size different from the predetermined quantization step size to a region that is not the specific region.

6. The image processing apparatus according to claim 4, wherein the image processing unit compresses the input image, and wherein the predetermined size region corresponds to a macroblock which is a processing unit for compressing.

7. A non-transitory computer-readable medium storing computer-executable process method for detecting specific region, the computer-executable process method comprising:
determining whether an input image is a specific color region that includes specific color in each predetermined size region, wherein the regions of the input image include a plurality of pixels;
classifying predetermined size regions of the input image to a first region, a second region or a third region, according to the determination result of determining the specific color region; and
determining a specific region determination unit that determines a specific region to be subjected to predetermined image processing, according to the result of classifying the region,
wherein it is classified that, in order of horizontal direction of the input image, a region which is the specific color region as a first region, a region which is not the specific color region as a third region, and a second region which is not specific color region but upper region is a first region,
wherein the classifying includes classifying a region which is classified as the second region as a first region, which is wedged by a region classified as a first region in the line which is being classified, before starting classifying processing of a bottom line which is being classified;
wherein it is determined that the area classified as the first region is the specific region.

* * * * *